United States Patent [19]

Hihara

[11] 4,202,214

[45] May 13, 1980

[54] WHEEL FIXING DEVICE FOR A WHEEL BALANCER

[75] Inventor: Yukiyoshi Hihara, Fujinomiya, Japan

[73] Assignee: Yasui Sangyo Co. Ltd., Fujinomiya, Japan

[21] Appl. No.: 940,896

[22] Filed: Sep. 11, 1978

[30] Foreign Application Priority Data

Jun. 23, 1978 [JP] Japan .................................. 53-76132

[51] Int. Cl.² ............................................ G01M 1/16
[52] U.S. Cl. .................................................... 73/487
[58] Field of Search ...................... 73/487; 144/288 A

[56] References Cited

U.S. PATENT DOCUMENTS 4,070,915  1/1978  Caroff .................................. 73/487

FOREIGN PATENT DOCUMENTS 1195071  6/1965  Fed. Rep. of Germany ............. 73/487
1134043 11/1956  France ..................................... 73/487
 687779  2/1953  United Kingdom ...................... 73/487

Primary Examiner—Jerry W. Myracle

[57] ABSTRACT

A wheel fitting device for a wheel balancer is disclosed which consists of a hub and several arms which are pivoted to the hub and are bolted to the holes of the wheel. In an embodiment the arms are provided with locking means which lock up their pivotal attachment to the hub when they are tightly bolted to the wheel at their other ends.

10 Claims, 4 Drawing Figures

WHEEL FIXING DEVICE FOR A WHEEL BALANCER

The present invention relates to a vehicle wheel fitting device for a wheel balancer.

In conventional wheel balancers, the wheel to be balanced has been fitted by fixing a circular adapter to the end of the wheel balancer axle, placing the fixing holes of the wheel over threaded bolts suitably arranged on the adapter, and bolting the wheel on.

However, in this kind of device the number and the positioning of the wheel fixing holes varies from one type or size of wheel to another. Therefore, when a different type of wheel is to be balanced, the adapter must be changed, which is very inconvenient. Furthermore, many different adapters must be kept in readiness, which is expensive.

Therefore it is an object of the present invention to provide a device for fixing a wheel to a wheel balancer which can be used for a wide variety of wheels, quickly and easily.

This object is attained, according to the present invention, by a wheel fixing device for a wheel balancer, comprising a flange attached to the end of the main axle of the balancer, in which are a plurality of holes, and a plurality of fixing arms of equal length, whose base ends are adapted to be pivotally attached to said holes in said flange, and whose free ends are provided with means for attaching a vehicle wheel.

Other features and merits of the present invention will become more clear from the following description of a preferred embodiment, taken in conjunction with the accompanying drawings, which however are given for the purposes of illustration only, and thus are not intended to be limitative of the present invention, and wherein.

Figure 1:
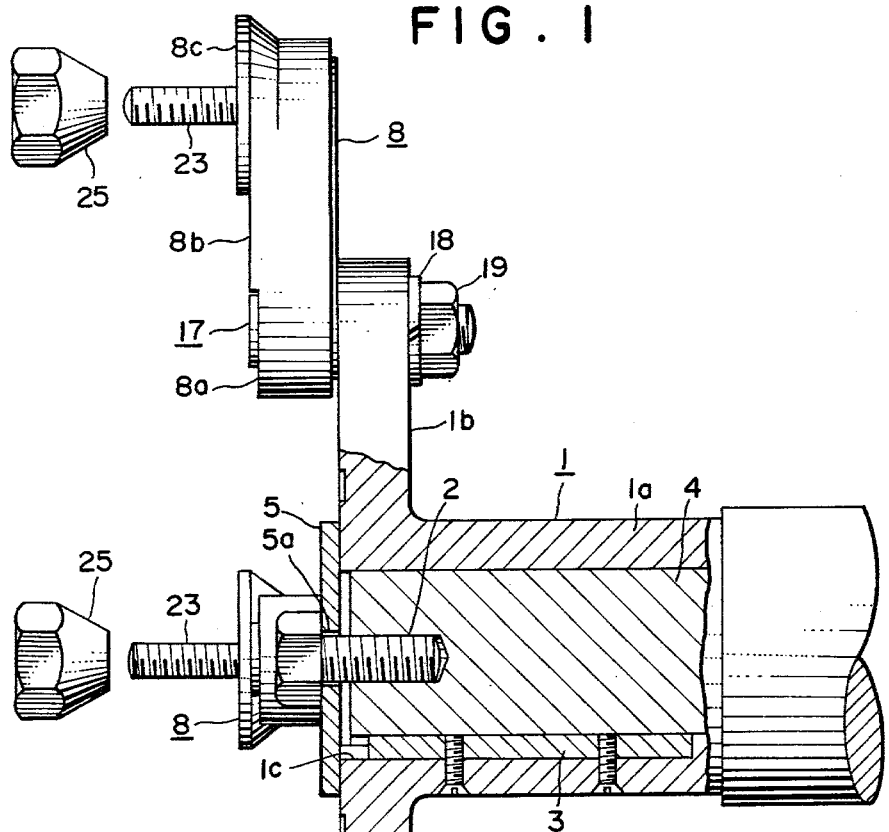
FIG. 1 is a view of a section through an embodiment of the present invention.
Figure 2:
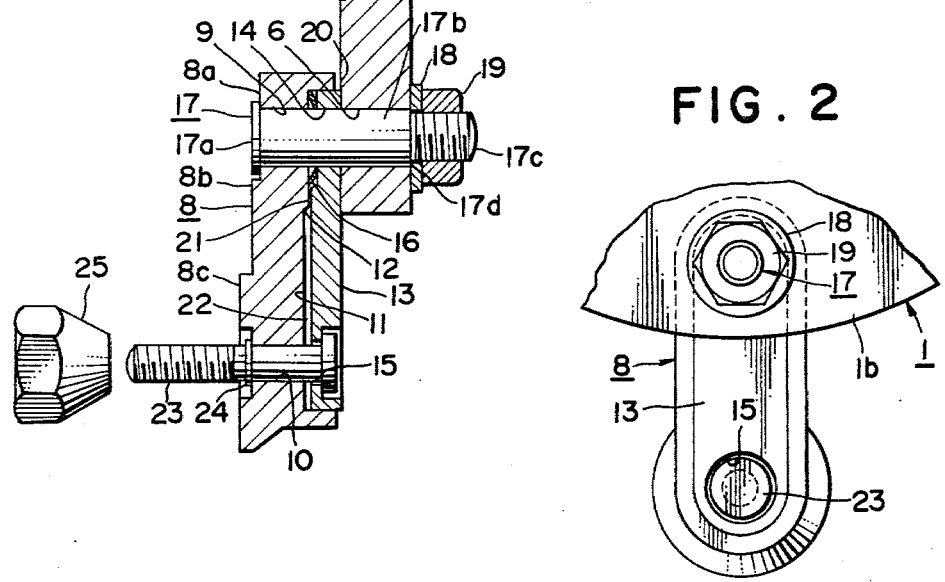
FIG. 2 is a view of one of the arms and locking plates of the embodiment of FIG. 1, as seen from the right hand side of FIG. 1.
Figure 3:
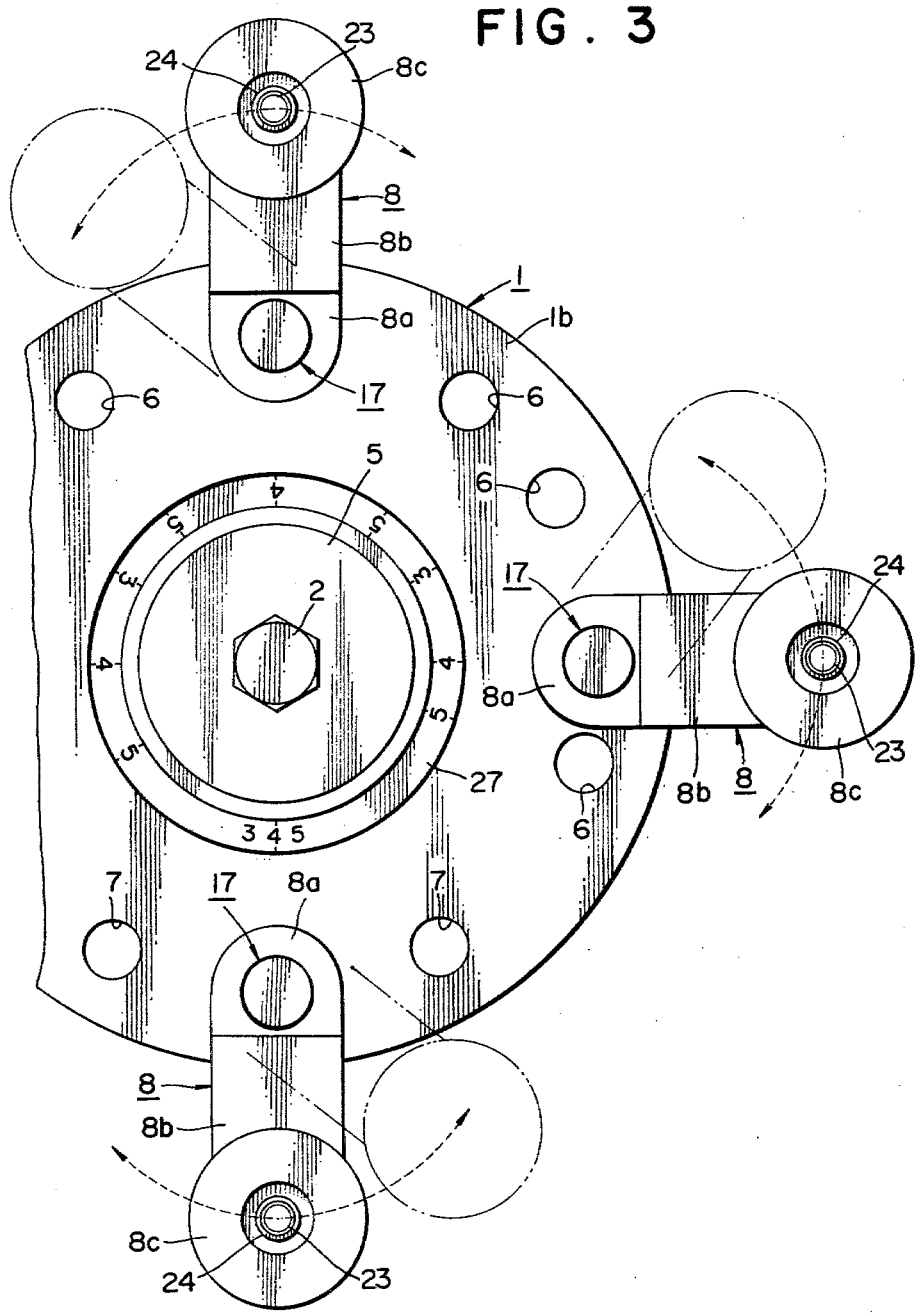
FIG. 3 is a view of the embodiment of FIG. 1, as seen from the left hand side of FIG. 1.
Figure 4:
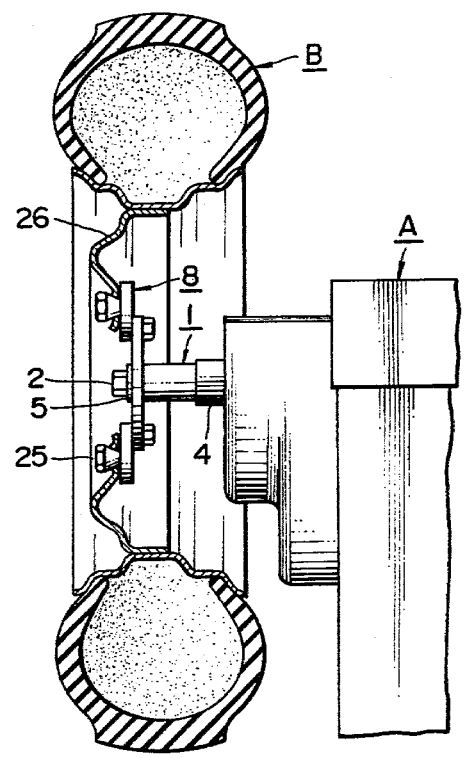
FIG. 4 is a schematic view, from the same point of view as FIG. 1, partly in section, showing the wheel balancer of FIG. 1 with a wheel mounted on it.

In the drawings, 1 designates a hub which comprises a fitting tube 1a and an outward facing flange 1b. In the inner surface of the fitting tube 1a is formed a key slot 1c. By inserting a key 3 into the key slot 1c and sliding the fitting tube 1a onto the front end of the axle 4 of the wheel balancer A, and then placing the seating plate 5 against the face of the flange 1b and screwing the bolt 2 through the central hole 5a in the seating plate into the axle 4, the hub 1 is fixed to the axle 4.

A plurality of fitting holes 6 are formed in the flange 1b, equidistant from its center. In the illustrated embodiment, these are provided in three sets: each set constituting the vertices of a regular polygon, one an equilateral triangle, one a square, and one a regular pentagon. The sets overlap; that is, one holes serves in several sets. Because of this, balance holes 7 are also provided to maintain the flange in overall dynamic balance. In other embodiments it might be useful to provide holes at the vertices of a regular hexagon, for example.

On the front surface of the flange 1b is mounted an indicator ring 27 which tells the operator which holes to use for what kind of wheel, i.e. which holes are the vertices of the square, which of the pentagon, and so on.

According to the present invention, a plurality of fixing arms of equal length are provided, each generally designated by 8. Each arm 8 is adapted to be pivoted at its one end to a hole in the flange 1b, and to be attached at its other end to the vehicle wheel 26 to be balanced, at the holes as usually provided therein.

When a wheel which has, for example, five fixing holes is to be balanced, five of the arms 8 are pivoted to the five holes 6 which form the vertices of the pentagon, by bolt means to be described, and their other ends are bolted by bolt means also to be described to the holes in the wheel. It will be noted that strictly speaking the resulting assembly will be rigid, and the wheel will be held firmly coaxially with the shaft of the wheel balancer. This is a consequence of the fact that if two similar polygons are placed so that their corresponding vertices are, in pairs, a certain constant distance away from one another, the polygons are constrained to have coincident centers, and any slight disturbance of one of the polygons relative to the other will violate the conditions. However, for added stiffness, the present embodiment is provided with locking means which lock up the arms 8 to the flange 1b when the wheel is attached.

The detail of these arms will now be described. Each arm 8 has the shape of of a fishplate with rounded ends, and, as seen in FIG. 1, the base end portion 8a is the thinnest portion, the central portion 8b is thicker, and the free end portion 8c is the thickest portion. At the base end portion 8aa is formed a through hole 9, and at the free end portion 8c is formed a through hole 10. On the back face of the arm 8 is formed a recess 11 of a shape similar to that of the arm, but a little smaller. The bottom of the recess 11 is formed of two depths, and is deeper toward the free end 8c of the arm, so that a little step 12 in the middle portion of the arm is formed.

In the recess 11 is located a locking bar 13 of the same shape as the recess 11 and a little smaller than it. The bar 13 is a little thinner than the depth of the base end of the recess 11, and is made of spring steel or other similarly elastic material. At the base and free ends of the bar 13 are formed through holes 14 and 15 coincident with the holes 9 and 10 respectively, and the hole 15 is stepped open at its upper end (the right end in FIG. 1).

A spring washer 16 is fitted between the arm 8 and the bar 13, and together this assembly is fixed to the flange 1b by a pin 17 which is passed from the left side in FIG. 1 through the holes 9 and 14 and the hole 6, and has the washer 18 and the nut 19 mounted on it. The thickness of the head 17a of the pin 17 is less than the difference of thickness of the base end 8a and the central portion 8b of the arm 8, and also the length of the central cylindrical portion 17b of the bolt 17 is a little longer than the sum of the thicknesses of the base end of the arm 8 and of the flange 1b. As seen in the figure, therefore, the washer 18, which has a hole formed in it which is smaller than the diameter of the cylindrical portion 17b of the bolt 17, cannot slip over the cylindrical portion 17b, but is clamped tightly against it by the nut 17. Even so, because of the dimensions stated above, when the nut 19 is tightened, there is still a small amount of play remaining between the arm 8 and the flange 1b, as shown by a gap 20 in the figure. The spring 16 presses gently the lock bar 13 against the flange 1b, as shown in the figure, and because of the dimensions as explained above a small gap 21 exists between the arm 8 and the lock bar 13. When no wheel is attached to the free end of the arm there also exists a gap, as shown by 22, between the free end of the arm 8 and the bar 13.

A bolt 23 to hold the vehicle wheel assembly B is inserted through the holes 15 and 10, and it is prevented from falling out by a snaplink 24 fitted in a recess formed in the front or left-hand in the figure surface of the arm 8. The head of the bolt 23 is received in the stepped recess of the hole 15 so that it does not project therefrom.

Finally, a nut 25 is provided which holds on the wheel assembly B to the free end of the arm 8, when it is fitted.

It is seen that when the wheel is not fitted to the free end of the arm 8, or even when it is loosely fitted but is not tightly attached, the arm 8 can be pivoted relative to the flange 1b about the bolt 17, against only the slight resistance provided by the spring 16. Further, the arm 8 with the lock bar 13 attached can be removed as a unit from the flange 1b, and attached to a different hole 6 therein, for instance.

However, when the wheel assembly B is fitted onto the arm 8 and the nut 25 is tightened, the little step 12 in the recess 11 at the back of the arm 8 acts as a fulcrum for the bar 13, and, provided the dimensions of the various parts are appropriately arranged, as will be evident to one skilled in the mechanical arts, the free or lower end in the figure of the bar 13 will move to the left in the figure, and the base or upper end in the figure of the bar will move to the right in the figure and be pulled against the flange 1b. Due to the elasticity of the bar 13, the full extent of the gap 22 will be closed, and by the upper extremity in the figure of the locking bar 13 being pushed hard against the flange 1b the arm 8 will be securely locked to the flange and will be unable to rotate with respect thereto.

Thus, to recapitulate, when the wheel fixing device of the present invention is being used, a number of arms 8 is selected appropriate to the number of fixing holes in the wheel to be attached to the balancer, and these arms are bolted to the appropriate holes in the flange 1b. The wheel is then fitted loosely on over the bolts 23 of these arms, which are pivoted outwards from the flange to the appropriate positions as needed, and then the bolts 23 are tightened, thus locking the arms securely and positively in place.

Thus it is seen that by using a wheel fixing device according to the present invention a very wide range of wheels may be fitted easily to the wheel balancer, and it is automatically ensured that they will be coaxially fitted.

Although the present invention has been shown and described with reference to a preferred embodiment thereof, it will be understood that various changes and alterations of the form and detail thereof may be made therein by one skilled in the art without departing from the scope of the invention. Therefore the scope of protection desired is not to be limited by any details of the embodiment described, but only by the attached claims.

What is claimed is:

1. A wheel fixing device for a wheel balancer, comprising:
    (a) a flange attached to the end of the main axle of the balancer, in which are a plurality of holes;
    (b) a plurality of fixing arms of equal length, whose base ends are adapted to be pivotally coupled to said holes in said flange, and whose free ends are provided with means for attaching a vehicle wheel; and
    (c) locking means for locking each of said fixing arms and its pivotal coupling to said flange upon the attachment of a wheel by said attaching means.

2. A device as in claim 1, wherein the holes in said flange are provided in one or more sets which form regular polygons about the axis of said axle.

3. A device as in claim 2, wherein several sets of holes are provided in sets which form regular polygons, and wherein said arms are provided with means whereby they may be removably pivoted to said holes in said flange.

4. A device as in claim 1, wherein the locking means on each fixing arm comprises a locking bar which is generally parallel to the arm and can pivot with respect to it about a fulcrum in the middle portion of the arm and the bar; the attaching means for the wheel, for each arm, comprises a bolt which passes through the ends of the arm and the locking bar remote from the flange ends; and the pivotal attachment of each fixing arm to the flange comprises a bolt, which passes through the base or flange ends of the arm and its locking bar, the locking bar being in between the arm and the flange.

5. A device as in claim 4 wherein further comprising a spring in between each fixing arm and the locking bar at the base end thereof, which urges the locking bar away from the fixing arm towards the flange so as to provide a certain amount of resistance when the arm is pivoted around the hole in the flange at which it is attached.

6. A device as in claim 5 wherein each locking bar is at least partially disposed in a recess on the corresponding fixing arm.

7. In a wheel balancer including a main axle and a flange at the end of the main axle formed with a plurality of holes therein, a wheel fixing device comprising:
    (a) a plurality of fixing arms of equal length, each having a free end and a base end;
    (b) a plurality of locking bars, each mounted parallel to a respective one of said fixing arms, said locking bar being pivotable with respect to said fixing arm about a fulcrum in the middle of the fixing arm and the locking bar;
    (c) a bolt disposed through the base end of each of the fixing arms, the adjacent portion of the locking bar and one of the holes in the flange, said locking bar being in between the fixing arm and the flange; and
    (d) means for attaching a vehicle wheel to the free ends of the fixing arms, said means for attaching comprising a bolt disposed through the free end of the fixing arm and the adjacent locking bar whereby the attachment of a vehicle wheel locks the fixing arms relative to the flange.

8. A device as in claim 7, wherein further comprising a spring in between each fixing arm and the locking bar at the base end thereof, which urges the locking bar away from the fixing arm towards the flange so as to provide a certain amount of resistance when the arm is pivoted around the hole in the flange at which it is attached.

9. A device as in claim 7, wherein the holes in said flange are provided in one or more sets which form regular polygons about the axis of said axle.

10. A device as in claim 7, wherein several sets of holes are provided in sets which form regular polygons, and wherein said arms are provided with means whereby they may be removably pivoted to said holes in said flange.

* * * * *